United States Patent Office 3,073,793
Patented Jan. 15, 1963

3,073,793
THERMOSET EPOXY RESIN PLASTICIZED WITH A GLYCOL ETHER-ESTER
Frank P. Greenspan, Larchmont, and Rupert E. Light, Jr., Poughkeepsie, N.Y., assignors to FMC Corporation, a corporation of Delaware
No Drawing. Filed June 30, 1959, Ser. No. 823,848
10 Claims. (Cl. 260—31.4)

This invention relates to plasticized, thermoset resinous products derived from complex epoxy resins having epoxy oxygen on terminal alkoxy groups only, and particularly to such resinous products plasticized with external plasticizers.

This application is being filed as a continuation-in-part of copending application Serial Number 586,914, filed May 24, 1956, now Patent 2,923,695, issued February 2, 1960 in the names of the present inventors.

Thermoplastic complex epoxy resins of the present type, which can be cured to a thermoset condition, have found widespread use in the manufacture of coatings, in the encapsulation of electrical components, and in the manufacture of laminates and adhesives. They suffer a basic disadvantage, however. By reason of their molecular structures, in thermoset condition they are rigid and are inclined toward brittleness. External plasticizers of the type commonly used with thermoplastic resins, e.g. the oil plasticizers normally employed for example with vinyl resins and cellulosic resins, generally have been found unsuited for use with these complex epoxy resins. This unsuitability is common to thermoset resins, and manifests itself in exudation of the plasticizer from the thermoset resin on ageing and in generally poor plasticizer efficiency. As a result, in order to flexibilize thermoset resinuous compositions derived from complex epoxy resins, users have found it necessary to modify the resins chemically before their conversion to a thermoset condition, by reaction with secondary polymer materials e.g. polyamides, Thiokol synthetic rubbers and other polymers containing functional groups reactive with the resins. Reaction of these secondary polymers with the complex epoxy resins complicates use of the resins and further introduces substantial chemical changes in the backbone structure of the resins, which in many instances is undesirable.

It is a feature of this invention to provide plasticized, thermoset resinous products derived from complex epoxy resins and curing agents therefor, and a method of providing plasticity in these resinous products with external plasticizers which are substantially non-reactive with the epoxy resins.

It is a further feature of this invention to provide such plasticized, thermoset resinous compositions wherein the external plasticizer is efficient and is resistant to exudation.

In accordance with the present invention a complex epoxy resin containing oxirane oxygen on terminal alkoxy groups only, is blended with up to about 40% of the total of a glycolether ester having a molecular weight of about 258 to 450 to produce a thermoplastic composition, and the epoxy resin component in the resulting blend is cross-linked with a curing agent for the epoxy resin. The plasticized, thermoset resinous product which results has a high degree of resiliency and toughness, and is resistant to impact. Furthermore, it retains these desirable properties on ageing, even when the resinous product is exposed to elevated temperatures during its formation or use.

The plasticizers useful herein are formed by the esterification of glycol-ethers with aliphatic acids or anhydrides. The glycol-ethers contain both alcohol groups and ether linkages, and are the ethers of ethylene glycol or diethylene glycol. Their structures are represented by the following formula:

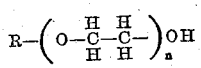

wherein R is an aliphatic, aryl or aralkyl group and $n=1$ or 2.

Various ethylene glycol-ethers are available commercially under the trade name "Cellosolve." Diethylene glycol-ethers are available under trade name "Carbitol."

The acids and anhydrides useful in forming the ester plasticizer are the monobasic saturated and unsaturated aliphatic acids and their anhydrides. The esterifying acid must be chosen to provide an ester which has a low vapor pressure at operating temperatures to which the plasticized compositions will be subjected. Proper choice of esterifying acid is based on the combined molecular weights of the esterifying acid, the group which forms the ether with the glycol, and the glycol residue. The formula of the ester plasticizer may be represented as

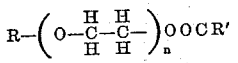

where $n=1$ to 2, R is ether forming radical, and R' is the ester forming radical.

The molecular weight of the ester should equal at least 258 in order that the plasticizer will be sufficiently non-volatile to resist exudation from the resinous composition either before, during or subsequent to its cure. Accordingly, the ester and ether radicals may be chosen in any ratio provided the glycol residue plus these radicals have a combined molecular weight of at least 258. An example of an ester having a suitable molecular weight is methyl Cellosolve oleate wherein the glycol residue has a molecular weight of 44, the methyl group, that is the ether radical, has a molecular weight of 15 and the oleate group, that is the ester radical, a molecular weight of 281, which combines to give a molecular weight of 340.

It has been found that esters having molecular weights substantially below about 258 are unsuitable for general use as plasticizers for epoxy resins which are to be subjected to elevated temperatures in the processing or curing of the resins or in subsequent use of the thermo-set resin. Apparently, the volatilities of esters having molecular weights substantially below 258 cause them to be lost from the resin either during cure or in use of the cured product when the resin or the product is exposed to elevated temperatures. Whatever the explanation may be as to the unsuitability of the esters having molecular weights below 258, as plasticizers for general use for epoxy resins, the fact appears to be that when epoxy resins are required to encounter elevated temperatures, either in curing of the resin or in use of the thermo-set resinous product, loss of the plasticizer does not occur or become manifest when the plasticizer is an ester having a molecular weight of 258 or more, in accordance with the present invention. As regards an upper limit on the molecular weight of the ester, it has been determined that esters having molecular weights substantially higher than 450 are difficult to compound with the resin by reason of their high melting points.

The esters are formed according to well-known esterification techniques. Typically, the acid and the glycol ether may be reacted in the presence of an acid such as sulfuric acid, which functions as a catalyst.

The glycol-ether esters have physical properties ranging from pourable liquids to soft solids. Typical liquid glycol-ether esters are ethyleneglycol methylether oleate, ethyleneglycol, ethylether ricinoleate, ethyleneglycol ethylethyleneglycol, and diethyleneglycol ethylether riciinoleate. Typical useful glycol-ether esters which are solids at or about room temperature are diethyleneglycol ethylether laurate and diethyleneglycol ethylether stearate. Choice of a liquid or solid plasticizer will be made on the basis of desired handling characteristics.

Thermoplastic complex epoxy resins which are useful herein are the di-(epoxyalkyl) ethers of polyhydric phenols. These resins, which are readily available under the trade names Epon resins and Araldite resins, are produced by condensation of polyhydric phenols with halopoxyalkanes or dichlorohydrins in the presence of alkali, or with polyepoxides. They contain epoxy and in some cases also hydroxy radicals on terminal alkoxy groups in the resin, and contain internal hydroxy groups and ether linkages. Polyhydric phenols which are useful in forming the resins are exemplified by the bisphenols, that is the dihydroxy diphenyl alkanes, resorcinol, hydroquinone, and the phenolaldehyde condensates. Suitable haloepoxyalkanes include epichlorohydrin, that is 1-chloro-2,3-epoxypropane, 1-chloro-2,3-epoxypentane and the like while suitable dichlorohydrins include glycerol dichlorohydrin and other similar compounds which convert to the corresponding epoxy compounds in the presence of alkali. Typical polyepoxy compounds useful in forming the resins are butane dioxide and hexane dioxide.

The term epoxy oxygen on terminal alkoxy groups of the resin only is intended to signify epoxy groups attached to ether alkoxy groups which are at the ends of the resin molecule. This would include 1,2- positioned epoxy groups such as exist in epichlorohydrin-bisphenol epoxy resins as well as epoxy groups attached to the terminal alkoxy groups in other positions, for example 2,3-positioned epoxy groups in epoxy resins formed from 1-chloro-2,3-epoxypentane by reaction with polyhydric phenols.

Resins having more than one and less than two epoxy groups per molecule are particularly useful herein, and are formed by reaction of a stoichiometric excess of the epoxy containing ingredient, e.g. epihalohydrin or polyepoxide, with the polyhydric phenol. However, in some cases the epoxy groups ring open to provide a resin having less than one epoxy group per molecule, and these resins can be plasticized with the present glycol-ether ester plasticizers.

Reaction products of bisphenols with an excess of epichlorohydrin, formed in the presence of an alkali, are the common complex epoxy resins and are preferred for use in forming the present plasticized compositions. These resins in common with the class of complex epoxy resins as a whole are available in liquid or solid state, and are soluble in organic solvents such as ketones and alcohols. They can be blended with the herein liquid or solid plasticizers simply by stirring them with the plasticizer, by mixing them with the plasticizer in a mutual solvent, or by heating the resin and/or plasticizer to their respective melting points and stirring them together. Choice of a suitable mixing method will be made on the basis of the properties of the resin and plasticizer.

The plasticizer normally is employed in the thermoset resinous product in an amount of no more than 40 parts by weight per 60 parts by weight of the epoxy resin. The exact amount employed is determined by the degree of plasticization desired, and may be as little as only a few percent in cases where it is desired merely to eliminate the extreme brittleness of the thermoset product. Use of amounts of plasticizer in excess of 40% is not recommended as at higher plasticizer levels the plasticizing efficiency falls off, and physical properties of the resin are deleteriously affected.

The complex epoxy resin component of the resin-plasticizer mixture is cured with a suitable curing agent, in order to provide the present plasticized, thermoset resinous product. The curing agent is introduced into the resin preferably immediately prior to conversion of the resin to thermoset condition, although it can be introduced at any previous time if precautions are taken to avoid premature cure of the resin. Suitable curing agents are of two types. The first type is the class of poly-functional crosslinking agents which contain as functional groups primary or secondary amine groups, mercaptan groups, carboxyl groups and other active hydrogen containing groups which are capable of crosslinking with the epoxy resin. The second type is the class of catalytic agents members of which are exemplified by boron trifluoride and tertiary amines which activate the hydroxyl and epoxy groups on adjacent epoxy resin molecules, thereby making possible polyaddition between these activated groups to link the molecules together. The polyfunctional crosslinking agents normally are employed in the amount of about 5–15% calculated on the resin, although they may be employed in greater or lesser amounts depending on the extent and speed of cure and the end product properties desired. The amount of catalytic curing agent which is employed will depend on the agent used, and is determined largely on an empirical basis. Thus for example generally when boron trifluoride is used as a catalyst, about 1–4% of this reagent is used, whereas with tertiary amines generally 4 to 8% of catalyst is employed. Heating normally accelerates the curing reaction, although as is well known certain of the curing agents for example certain amines or boron trifluoride, will permit room temperature cure.

Other compounding agents, for example fillers, dyes, pigments, and modifying polymers such as polyamide resins, Thiokol synthetic rubbers and the like may be employed in the plasticized products as desired. These added compounding agents may be incorporated into the complex epoxy resin at any time prior to conversion of the resin to thermoset condition.

The thermoset resinous products formed by reaction of the complex epoxy resin with the curing agent and containing the glycol-ether esters as plasticizers, have properties which range from hard to soft, and from slightly brittle to flexible and resilient. At a plasticizer level of about 40 parts per 60 parts of resin, the thermoset resinous composition is quite rubbery and highly resilient. At a plasticizer level of 20 parts per 80 parts of resin the thermoset product is hard, but is substantially less hard than a corresponding unplasticized product, having a hardness on the Barcol hardness scale in the neighborhood of 50 as compared with a hardness of approximately 80 in the case of the unplasticized product. Films of thermoset resinous product containing plasticizer in amounts falling within the above range are flexible, and show a high degree of resistance to cracking. Ageing does not reduce the effectiveness of the plasticizer, tests conducted 27 months after formation of the compositions having hardnesses of the above order. Use of lesser amounts of plasticizer results in production of thermoset products having correspondingly higher hardness values. This is desirable particularly in the case of films, where flexibility and resilience are of importance but the product must also have high hardness.

The plasticizer functions in the thermoset resinous product as an external plasticizer. That is to say, it acts as a mechanical plasticizing agent and does not become a part of the resin molecule. This is evidenced by the fact that a major portion of the plasticizer in unchanged form can be extracted from shavings of the thermoset resinous product, by refluxing for 10 to 15 hours with solvents such as heptane or ethyl ether. It is difficult to remove all of the plasticizer as it is bound mechanically within the intractable thermoset resin, and accordingly cannot be reached readily by the solvent.

A very important use of these plasticized, thermoset resinous products is as surface coatings. In this case the complex epoxy resin, a suitable curing agent and the plasticizer are dissolved or suspended in a solvent and are deposited therefrom onto the surface to be coated. The solvent then is evaporated to deposit a film which cures to a tough, resilient coating. The hardness and degree of resilience and flexibility in the film can be regulated readily by proper choice of glycol-ether ester plasticizer and amount thereof.

The resin-plasticizer blends likewise are useful in the production of castings. A liquid composition comprising a complex epoxy resin, a plasticizer and a curing agent is blended and poured into a mold, where it is cured either at room temperature or by the application of heat. The thermoset resinous product which results shows excellent reproduction of the mold shape, and unusual freedom from crazing and changes in physical properties on ageing. A particularly interesting application of casting resins of this type is in the encapsulation or potting of electrical components. Other uses of these compositions will suggest themselves to those versed in the polymer art.

The following examples are given by way of illustration only, and are not to be construed as limiting the ingredients, proportions thereof or reaction conditions which are within the scope of this invention.

EXAMPLE 1

Blank, DETA (Diethylene Triamine) Cure 50 gr. of Epon 834 was placed in an aluminum foil cup, and 4 gr. of DETA was stirred into it. The Epon 834 is a semi-solid epoxy resin having a melting point of 20–28° C., and an epoxide equivalency of 225–290, and is formed by reaction of 4,4'-dihydroxydiphenyl propane and epichlorohydrin. A small portion of this mixture was applied as a 3 mil coating to a 3" x 6", 30 gauge tin plate and a further small portion was applied in the same way to a 3" x 6", 20 gauge steel plate. The coated plates and the aluminum foil cup containing the resin mixture were placed in an oven and baked at 115° C. for 30 minutes. The plates and cup then were removed from the oven and permitted to cool at room temperature. Following this, the aluminum foil cup was stripped from the cured sample contained therein, and this sample and the coated plates were aged for one week. The cured casting which was removed from the aluminum foil cup was tested at the end of this period for hardness with a Barcol impressor, and the film coating on the tin plate was tested for flex resistance by bending the tin plate rapidly over mandrels and noting the minimum diameter mandrel over which the plate could be bent without film cracking. This film also was tested for adhesion by scratching the film with a knife. The coating on the steel plate was tested for impact resistance in a falling weight Gardner impact tester. Results of these tests appear in Table I.

EXAMPLE 2

5% Plasticizer, DETA Cure 47.5 gr. of Epon 834, 2.5 gr. of ethyleneglycol methylether stearate, and 4 gr. of DETA were mixed, and treated according to the procedure in Example 1. See Table I for results.

EXAMPLE 3

30% Plasticizer, DETA Cure 35 gr. of Epon 834, 15 gr. of ethyleneglycol methylether stearate, and 4 gr. of DETA were mixed, and treated according to the procedure in Examples 1 and 2. See Table I for results.

TABLE I

| Example | Impact[1] Resistance, inch pounds | Barcol[2] Hardness on casting | Adhesion on film | Flex[3] Resistance on film |
|---|---|---|---|---|
| Ex. 1. (Blank) | 6 | 84 | good | Failed 1". |
| Ex. 2. (5% Plasticizer) | 9 | 79 | good-excellent. | Passed ½". |
| Ex. 3. (30% Plasticizer). | 130+ | 41 | excellent | Passed ⅛". |

[1] Gardner impact tester.
[2] Barcol impressor.
[3] Bent quickly over a mandrel of indicated diameter.

The following table, Table II, records the properties of unplasticized and plasticized Epon 828 cured resins which were aged for periods up to 27 months. The Epon 828 is a viscous, liquid epoxy resin having a melting point of 8–12° C. and an epoxide equivalency of 190 to 210 and is formed by reaction of 4,4'-dihydroxydiphenyl propane and epichlorohydrin in a molar ratio, respectively, of about 1:2. Each of the samples was prepared as a casting by the technique described above, that is the Epon resin, the plasticizer and the curing agent were mixed in an aluminum foil cup and cured therein. The percent and nature of plasticizer, the cure times and the curing temperatures are given in the table. The curing agent employed in these examples was curing agent D, and this agent was used in the amount of 10.5 parts per 100 parts of formulation. Curing agent D is the 2-ethylhexoic acid salt of tri-(dimethyl aminomethyl) phenol.

TABLE II

| Plasticizer | Percent | Curing, Hrs. | Curing, Temp., ° C. | Aged, Months | Barcol Hardness |
|---|---|---|---|---|---|
| Blank | 0 | 2 | 120 | 22 | 83 |
| Ethyleneglycol[1] butylether stearate | 20 | 2 | 120 | 15 | 45 |
| Ethyleneglycol butylether oleate | 20 | 2 | 120 | 15 | 53 |
| Ethyleneglycol butylether laurate | 20 | 2 | 120 | 15 | 45 |
| Ethyleneglycol methylether laurate | 20 | 2 | 120 | 15 | 35–40 |
| Ethyleneglycol methylether stearate | 20 | 2 | 120 | 22 | 45 |
| Ethyleneglycol methylether oleate | 20 | 2 | 120 | 24 | 52–55 |
| Ethyleneglycol butylether soyoate | 20 | 1.5 | 115 | 27 | 60 |
| Diethyleneglycol[2] ethylether oleate | 20 | 1.5 | 115 | 27 | 45–55 |

[1] Butyl Cellosolve stearate.
[2] Ethyl carbitol oleate.

Having described our invention, what we claim as new and desire to secure by Letters Patent of the United States is:

1. Plasticized, thermoset resinous product, consisting essentially of (a) a thermoset resin formed by reaction of a complex epoxy resin having epoxy oxygen attached to adjacent carbon atoms on terminal 3 to 6 carbon alkoxy groups of the resin only, with a curing agent for said epoxy resin, and (b) as an external plasticizer for the thermoset resin about 5 to 40 parts by weight of a glycol-ether ester of the following formula

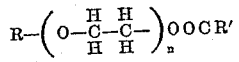

where R is a 1 to 4 carbon alkyl radical, R' is a 2 to 17 carbon straight-chain aliphatic hydrocarbon group, and $n$ is an integer from 1 to 2, said ester having a molecular weight of about 258 to 450 and being compatible with said thermoset resin and exhibiting its plasticizing effect on said thermoset resin on ageing of the thermoset resinous product.

2. Plasticized, thermoset resinous product, consisting essentially of (a) a thermoset resin formed by reaction of a complex epoxy resin having epoxy oxygen attached to adjacent carbon atoms on terminal 3 to 6 carbon alkoxy groups of the resin only, with a curing agent for said epoxy resin, and (b) as an external plasticizer for the thermoset resin about 5 to 40 parts by weight of an ethylene glycol-ether ester of the following formula

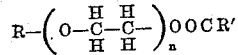

where R is a 1 to 4 carbon alkyl radical, R' is a 2 to 17 carbon straight-chain aliphatic hydrocarbon group, and $n=1$, said ester having a molecular weight of about 258 to 450 and being compatible with said thermoset resin and exhibiting its plasticizing effect on said thermoset resin on ageing of the thermoset resinous product.

3. Plasticized, thermoset resinous product, consisting essentially of (a) a thermoset resin formed by reaction of a complex epoxy resin having epoxy oxygen attached to adjacent carbon atoms on terminal 3 to 6 carbon alkoxy groups of the resin only, with a curing agent for said epoxy resin, and (b) as an external plasticizer for the thermoset resin about 5 to 40 parts by weight of a diethylene glycol-ether ester of the following formula

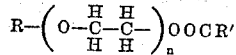

where R is a 1 to 4 carbon alkyl radical, R' is a 2 to 17 carbon straight-chain aliphatic hydrocarbon group and n=2, said ester having a molecular weight of about 258 to 450 and being compatible with said thermoset resin and exhibiting its plasticizing effect on said thermoset resin on ageing of the thermoset resinous product.

4. Plasticized, thermoset resinous product, consisting essentially of (a) a thermoset resin formed by reaction of a curing agent with a complex epoxy resin having epoxy oxygen attached to adjacent carbon atoms on 3 to 6 carbon terminal alkoxy groups of the resin only, said epoxy resin being formed by reaction of a polyhydric phenol with an epihalohydrin, and (b) as an external plasticizer for the thermoset resin about 5 to 40 parts by weight of a glycol-ether ester of the following formula

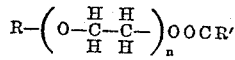

where R is a 1 to 4 carbon alkyl radical, R' is a 2 to 17 carbon straight-chain aliphatic hydrocarbon group and n is an integer from 1 to 2, said ester having a molecular weight of about 258 to 450 and being compatible with said thermoset resin and exhibiting its plasticizing effect on said thermoset resin on ageing of the thermoset resinous product.

5. Plasticized, thermoset resinous product, consisting essentially of (a) a thermoset resin formed by reaction of a complex epoxy resin having epoxy oxygen attached to adjacent carbon atoms on terminal 3 to 6 carbon alkoxy groups of the resin only, with a curing agent for said epoxy resin, and (b) as an external plasticizer for the thermoset resin about 5 to 40 parts by weight of ethylene-glycol butylether oleate said plasticizer being compatible with said thermoset resin and exhibiting its plasticizing effect on said thermoset resin on ageing of the thermoset resinous product.

6. Plasticized, thermoset resinous product, consisting essentially of (a) a thermoset resin formed by reaction of a complex epoxy resin having epoxy oxygen attached to adjacent carbon atoms on terminal 3 to 6 carbon alkoxy groups of the resin only, with a curing agent for said epoxy resin, and (b) as an external plasticizer for the thermoset resin about 5 to 40 parts by weight of ethylene-glycol butylether stearate said plasticizer being compatible with said thermoset resin and exhibiting its plasticizing effect on said thermoset resin on ageing of the thermoset resinous product.

7. Plasticized, thermoset resinous product, consisting essentially of (a) a thermoset resin formed by reaction of a complex epoxy resin having epoxy oxygen attached to adjacent carbon atoms on terminal 3 to 6 carbon alkoxy groups of the resin only, with a curing agent for said epoxy resin, and (b) as an external plasticizer for the thermoset resin about 5 to 40 parts by weight of ethyleneglycol methylether laurate said plasticizer being compatible with said thermoset resin and exhibiting its plasticizing effect on said thermoset resin on ageing of the thermoset resinous product.

8. Plasticized, thermoset resinous product, consisting essentially of (a) a thermoset resin formed by reaction of a complex epoxy resin having epoxy oxygen attached to adjacent carbon atoms on terminal 3 to 6 carbon alkoxy groups of the resin only, with a curing agent for said epoxy resin, and (b) as an external plasticizer for the thermoset resin about 5 to 40 parts by weight of diethylene-glycol ethylether oleate said plasticizer being compatible with said thermoset resin and exhibiting its plasticizing effect on said thermoset resin on ageing of the thermoset resinous product.

9. Thermosetting composition useful in forming a plasticized, thermoset resinous product, consisting essentially of in admixture (a) a complex epoxy resin having epoxy oxygen attached to adjacent carbon atoms on 3 to 6 carbon terminal alkoxy groups of the resin only, (b) a curing agent for said epoxy resin, and (c) about 5 to 40 parts of a glycol-ether ester of the following formula

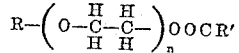

where R is a 1 to 4 carbon alkyl radical, R' is a 2 to 17 carbon straight-chain aliphatic hydrocarbon group and n is an integer from 1 to 2, said ester having a molecular weight of about 258 to 450.

10. Plasticized, thermoset resinous product, consisting essentially of (a) a thermoset resin formed by reaction of a curing agent with a complex epoxy resin having epoxy oxygen attached to adjacent carbon atoms on terminal 3 to 6 carbon alkoxy groups of the resin only, said epoxy resin having been formed by reaction of epichlorohydrin with a bisphenol, and (b) as an external plasticizer for the thermoset resin about 5 to 40 parts by weight of a glycol-ether ester of the following formula

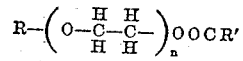

where R is a 1 to 4 carbon alkyl radical, R' is a 2 to 17 carbon straight-chain aliphatic hydrocarbon group and n is an integer from 1 to 2, said ester having a molecular weight of about 258 to 450 and being compatible with said theromet resin and exhibiting its plasticizing effect on said thermoset resin on ageing of the thermoset resinous product.

References Cited in the file of this patent

UNITED STATES PATENTS

| | | |
|---|---|---|
| 2,768,153 | Shokal | Oct. 23, 1956 |
| 2,801,229 | De Hoff | July 30, 1957 |
| 2,894,920 | Ramos | July 14, 1959 |

OTHER REFERENCES

Modern Plastics Encyclopedia Issue, September 1954, pub. Plastics Catalogue Corp., Bristol, Conn., page 818, Plasticizers Chart.

UNITED STATES PATENT OFFICE
CERTIFICATE OF CORRECTION

Patent No. 3,073,793  January 15, 1963

Frank P. Greenspan et al.

It is hereby certified that error appears in the above numbered patent requiring correction and that the said Letters Patent should read as corrected below.

Column 2, line 10, after "under" insert -- the --; line 2 after "is", first occurrence, insert -- the --; line 70, for "riciinoleate" read -- ricinoleate --; column 3, lines 8 and 9 for "halopoxyalkanes" read -- haloepoxyalkanes --; column 5, TABLE I, last column, strike out "Failed 1" " and insert the same in the next line above, opposite "Ex. 1 (Blank)"; column 6, line 59, for "resinuous" read -- resinous --; column 8, line 20, for "theremoset" read -- thermoset --; line 48, for "theromet" read -- thermoset --.

Signed and sealed this 3rd day of September 1963.

(SEAL)
Attest:

ERNEST W. SWIDER  
Attesting Officer

DAVID L. LADD  
Commissioner of Patents